J. VAN ACKEREN.
COKING RETORT OVEN.
APPLICATION FILED FEB. 7, 1917.

1,312,372.

Patented Aug. 5, 1919.
9 SHEETS—SHEET 4.

Fig. 4    Fig. 5

Witnesses:
Inventor
Josef van Ackeren

UNITED STATES PATENT OFFICE.

JOSEF VAN ACKEREN, OF PITTSBURGH, PENNSYLVANIA, ASSIGNOR TO THE KOPPERS COMPANY, OF PITTSBURGH, PENNSYLVANIA, A CORPORATION OF PENNSYLVANIA.

COKING RETORT-OVEN.

1,312,372.    Specification of Letters Patent.    Patented Aug. 5, 1919.

Application filed February 7, 1917. Serial No. 147,123.

*To all whom it may concern:*

Be it known that I, JOSEF VAN ACKEREN, a citizen of the United States, residing in Pittsburgh, in the county of Allegheny and State of Pennsylvania, have invented a new and useful Improvement in Coking Retort-Ovens, of which the following is a specification.

This invention relates to coking retort ovens, and more particularly to those of the well-known Koppers combination gas-oven and coke-oven type, exemplified in the Koppers coke-oven Patents 1,026,169, 1,176,067 and others, and also more particularly relates to coking retort ovens that are of the well-known Koppers cross-regenerator type, exemplified in the Koppers coke-oven Patent 818,033 and others, and that have the flue-construction set forth or claimed in the Schwab coke-oven Patent 989,302, and also more particularly relates to such other coking retort oven constructions as are hereinafter set forth or claimed. And the invention includes among its objects an increasing of the coking efficiency of such ovens, an increasing of their flexibility of operation, a reducing of their cost of maintenance, an increasing of their permanence and durability and resistance to the strains and variations of the high temperature conditions to which they are subjected, and such other improvements or advantages in construction and operation as are found to obtain in the structures and devices hereinafter described or claimed.

In the accompanying drawings, forming a part of this specification, and showing, for purposes of exemplification, a preferred form and manner in which the invention may be embodied and practised, but without limiting the claimed invention specifically to such illustrative instance or instances: Fig. 8 is an enlarged horizontal sectional and plan view at a higher level over the same heating-wall, taken on the line 8—8 of Fig. 3 and showing the passages that provide access to the flues and to the slide-bricks adjustable over their top ports, which open into the pair of horizontal combustion-products ducts that are indicated in dotted lines.

The series of heating-walls 25, 25 and the series of intermediate elongated coking-chambers 26, 26 in the battery are mainly supported by the heavy supporting-walls 27, 27 located under the heating-walls. The regenerators are located between the heavy supporting-walls and alined under the soles of the respective coking-chambers, and are of the "cross-regenerator" type, the type characterized by the fact that the regenerator extends crosswise of the battery so that the main flow into and out of the base of each main regenerator-chamber is substantially parallel with the length of the heating-wall or walls communicating with such regenerator-chamber.

There are a pair of regenerators under the sole of each coking-chamber, the members of the pair being separated by the gas-tight partition wall 28 transversely positioned under the middle of the sole of the coking-chamber. Each of said regenerators is longitudinally subdivided by a relatively thin partition 29, which itself supplements the regenerative surface provided by the checker-bricks in the rest of the regenerator-chamber.

Figure 1:
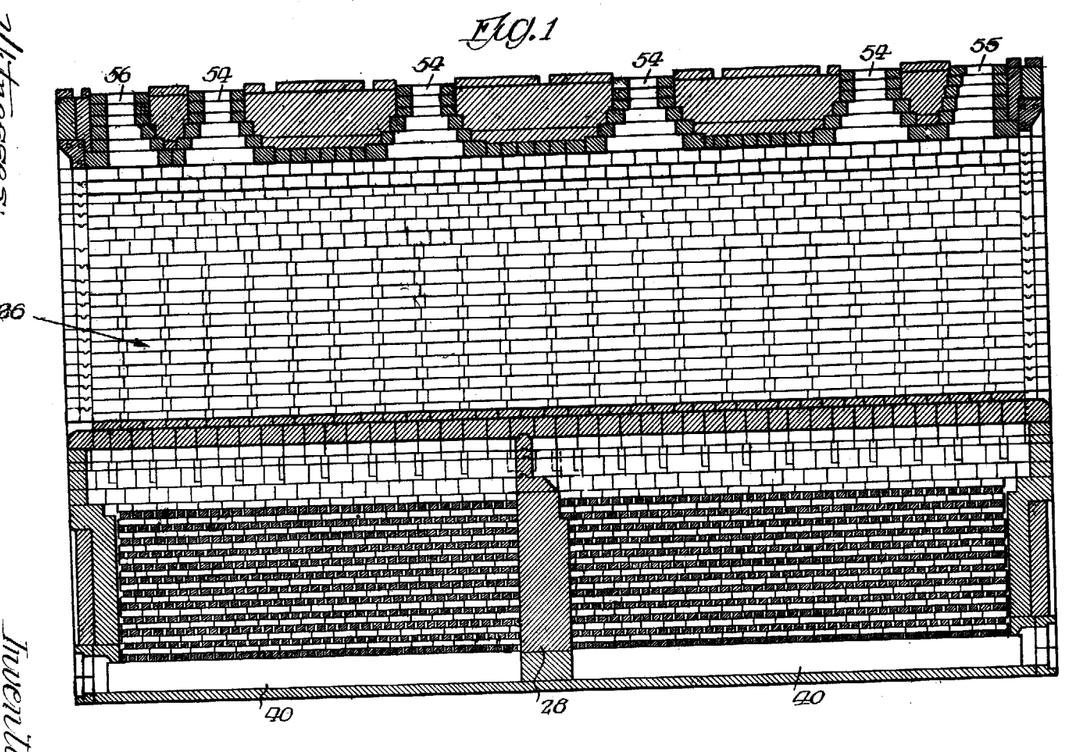
—Figure 1 is a vertical section longitudinally through a coking-chamber and the regenerators below it, on the line 1—1 of Fig. 3.
Figure 2:
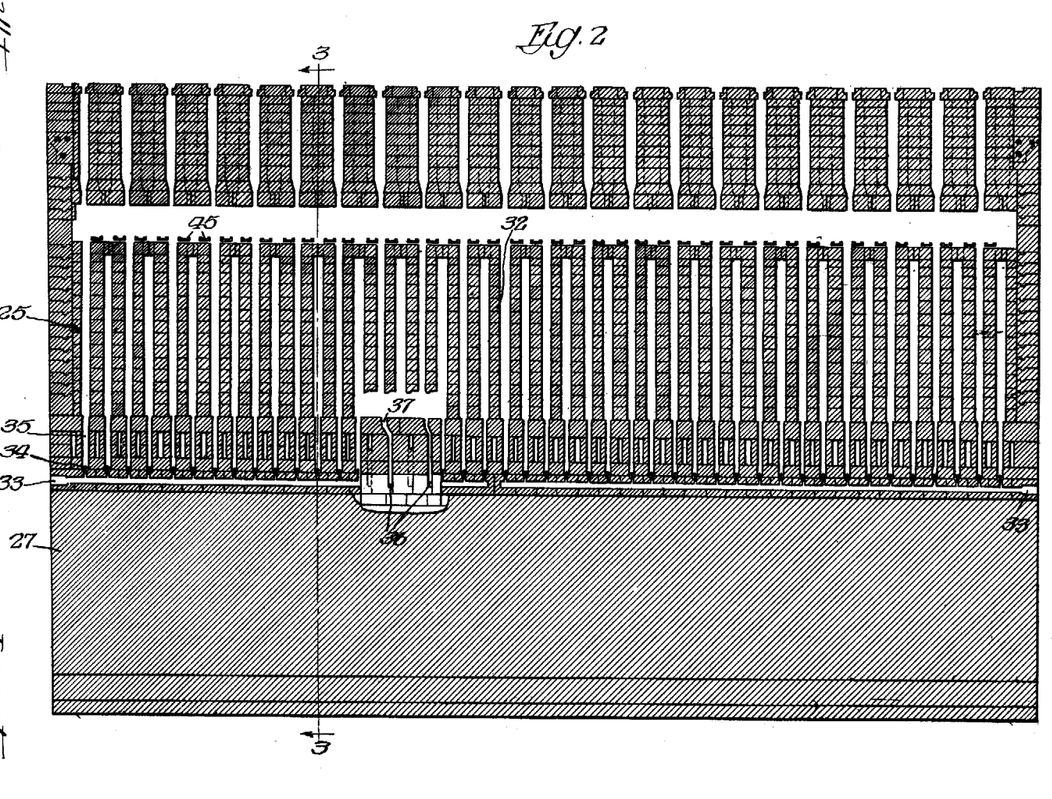
Fig. 2 is a vertical section longitudinally through a heating-wall, on the lines 2—2 and 2'—2' and 2''—2'' of Fig. 3, the left-hand end of said Fig. 2 being taken on the line 2—2 and the right-hand end on the line 2'—2' and the short intermediate section on the line 2''—2''.
Figure 3:
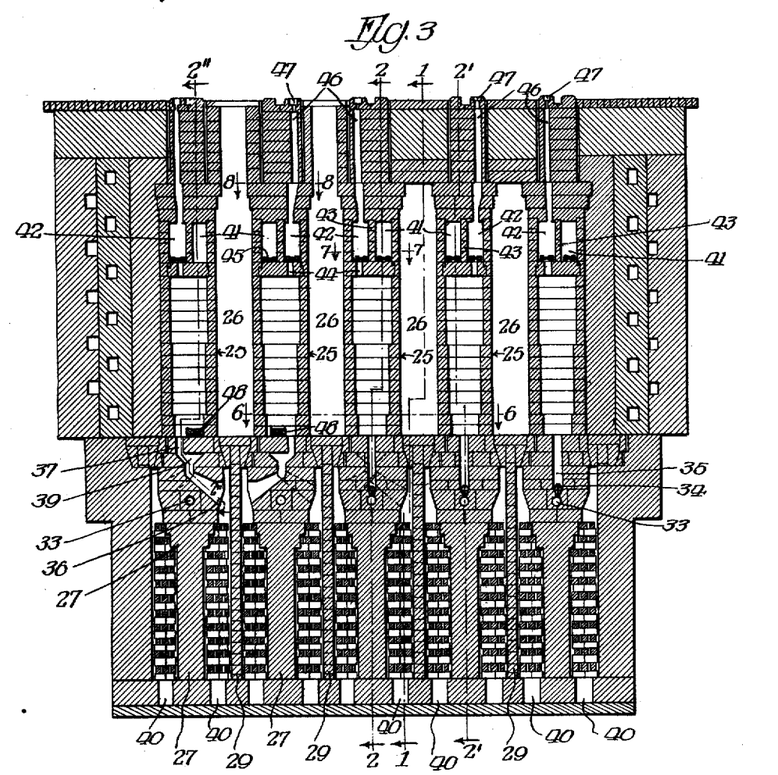
Fig. 3 is a vertical transverse section through a battery of four ovens, taken on the line 3—3 of Fig. 2, without indicating the diagonal partitioning in the heating-walls.
Figure 4:
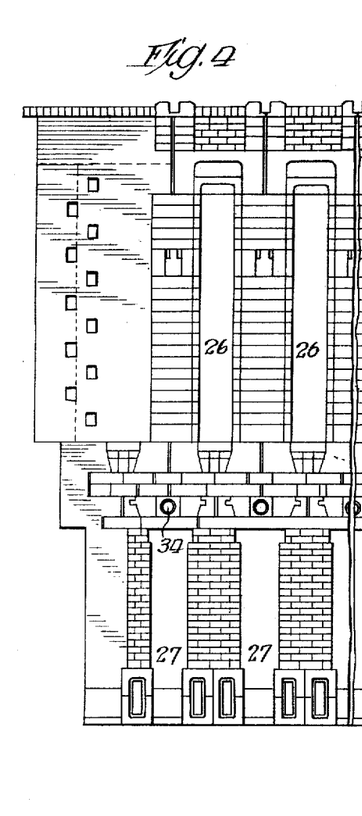
Fig. 4 is a front elevation of two of the ovens, taken on the pusher side.
Figure 5:
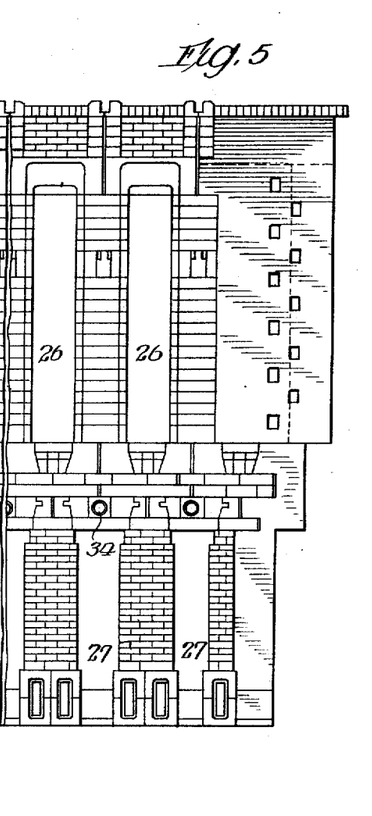
Fig. 5 is a front elevation of the same two ovens, taken on the coke side.
Figure 6:
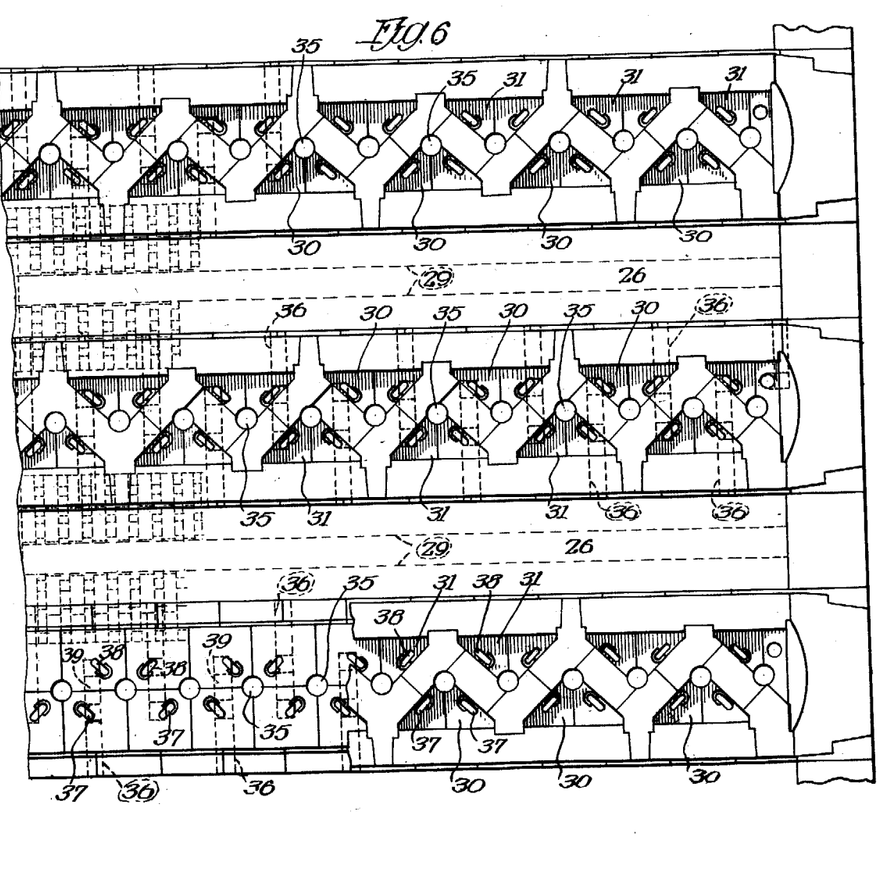
Fig. 6 is an enlarged horizontal section and plan view through three of the heating-walls, taken on the line 6—6 of Fig. 3, showing the triangular flues in section and the bottoms and air and gas ports of said flues in plan.
Figure 7:
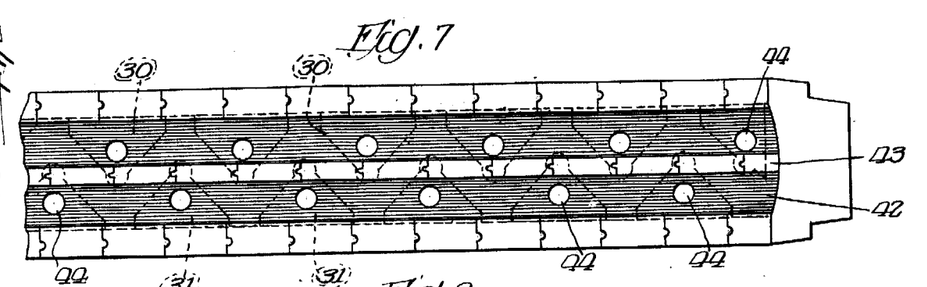
Fig. 7 is an enlarged horizontal sectional and plan view through the combustion-products ducts above one of the heating-walls, taken on the line 7—7 of Fig. 3 and showing in plan the top ports of the triangular flues, which are indicated in dotted lines.
Figure 9:
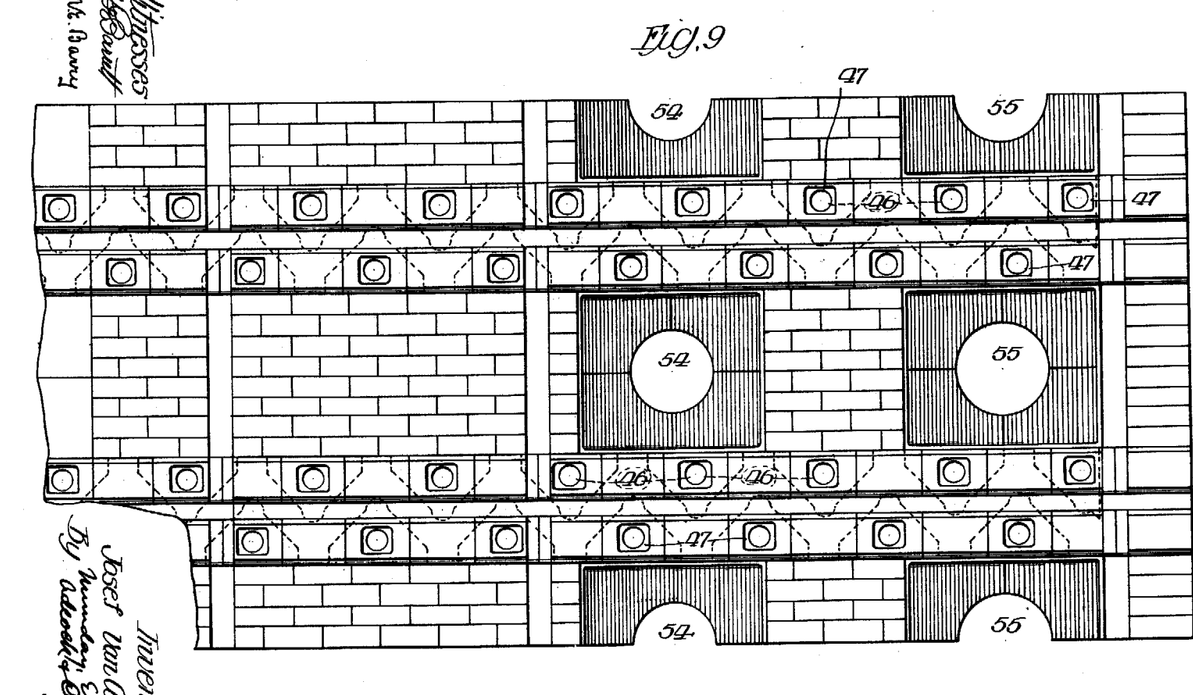
Fig. 9 is a top plan view taken over a couple of the heating-walls and extending from the pusher end of the ovens, showing in full plan the by-product port and one of the charge holes of the coking-chamber between the two heating-walls whose triangular flues are indicated in dotted lines.
Figure 10:
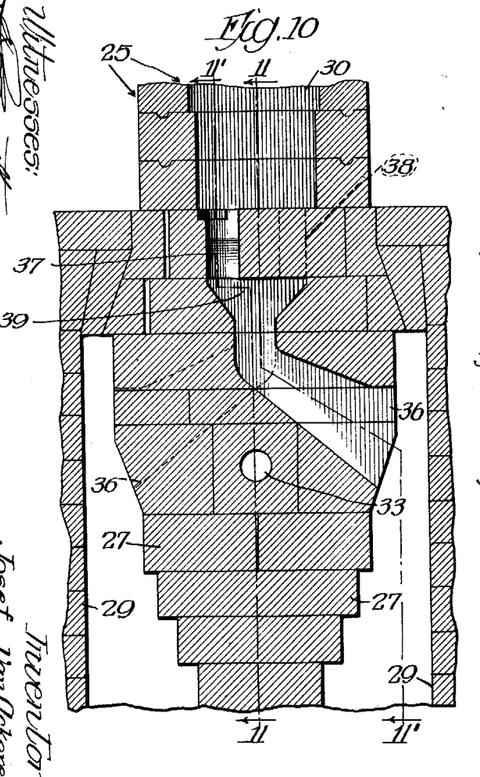
Fig. 10 is an enlarged vertical transverse section through the base of one of the heating-walls and the top of the heavy supporting-wall beneath such heating-wall, to show the general arrangement of the ducts joining the flues of the heating-wall with the regenerators on the respective sides of the said supporting-wall, but without indicating the diagonal partitioning in the heating-wall.
Figure 11:
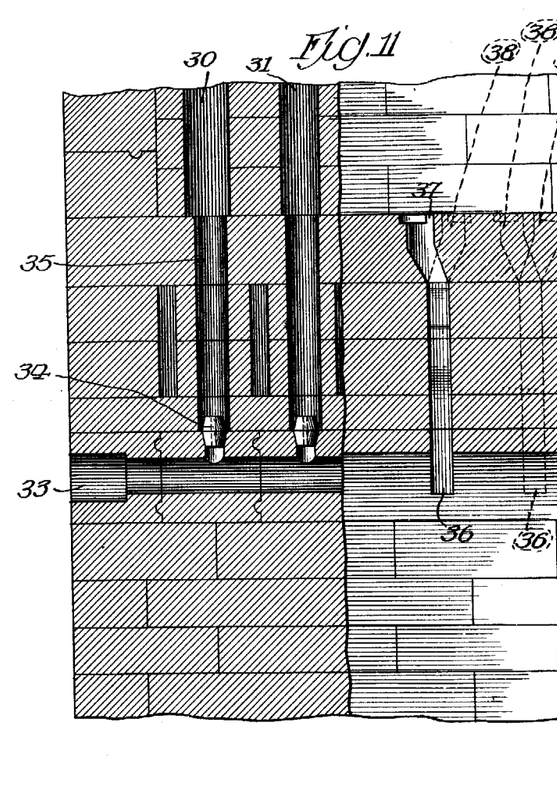
Fig. 11 is a vertical longitudinal sectional view taken on the lines 11—11 and 11'—11' of Fig. 10, the left-hand part of said Fig. 11 being on the line 11—11 and showing more particularly the coke-oven-gas inlets into the flues, and the right-hand part being on the line 11'—11' and showing more particularly the general arrangement of the ducts joining the flues with the regenerators.
Figure 12:
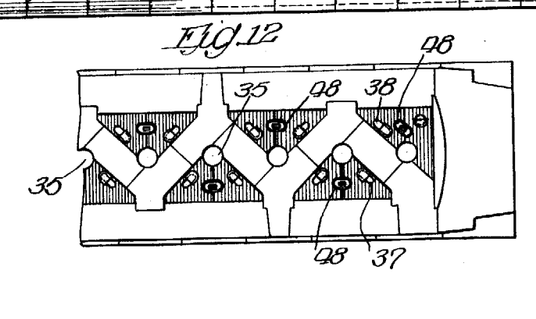
Fig. 12 is a horizontal sectional and plan view of one of the heating-walls just as shown in Fig. 6 but with the plugging devices inserted in the two regenerator-duct ports in the bottom of each flue, and also showing the movable closure-brick that may be employed to close either of said two ports in each flue.
Figure 13:
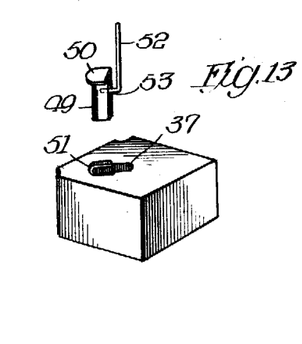
Fig. 13 is an enlarged perspective view showing one of the plugging devices as it is lowered into or lifted from the regenerator-duct port in the brick in which such port is formed.
Figure 14:
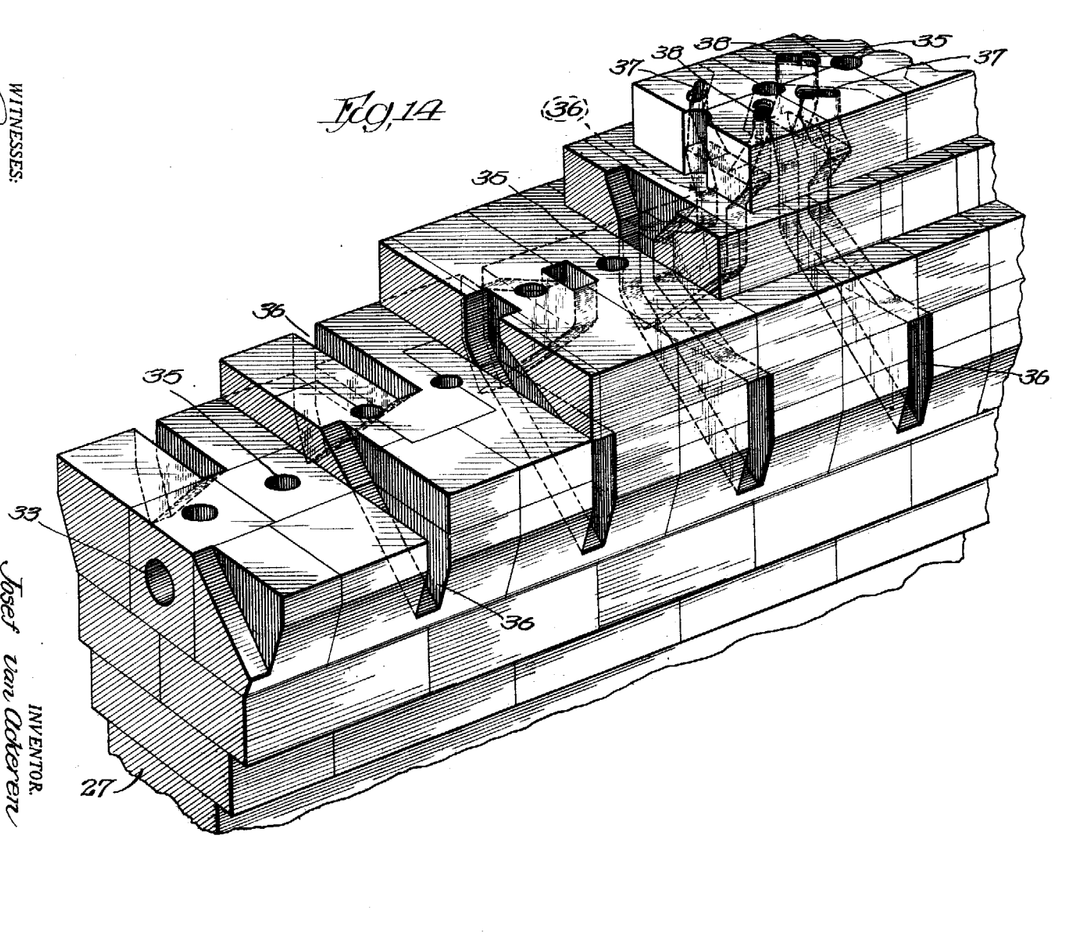
Fig. 14 is an enlarged perspective view showing the tier by tier construction and arrangement of the forked regenerator-ducts at the top of the heavy supporting-wall under a heating-wall, a pair of such forked ducts being completely shown in dotted lines in the upper right-hand portion of the view, and the bases of the triangular flues being also there indicated, to show the manner in which such forked ducts join the flues with the regenerators on the respectively opposite sides of the heavy wall. Like reference numerals indicate like parts in all of the figures.

Each heating-wall is constituted of two series, 30 and 31, of substantially triangular combustion-flues alternately facing oppositely toward the coking-chambers contiguous to either side of each such heating-wall. Each of such flues, by reason of its triangular form, is relatively narrow transversely of the wall and presents a wide heating-face toward the contiguous coking-chamber. The said two series of flues in each heating-wall are operatively disposed in two groups, each of about half the length of the heating-wall and respectively on opposite sides of the center-wall 32 (indicated at the middle of the length of the heating-wall shown in longitudinal section in Fig. 2).

The two series of triangular flues in each half of the length of each heating-wall are arranged to be supplied with coke-oven-gas from a single straight gas-duct 33, which extends under half of the length of the heating-wall and is provided with a series of nozzles 34 respectively opening into vertical channels 35 leading upward respectively into the inside angles of the flues of both series in the group constituting the corresponding half of the heating-wall.

Each regenerator communicates with each flue of both series of flues in each of the two heating-walls adjacent opposite sides of the top of such regenerator, extending substantially half of the length of the coking-chamber above said regenerator. Such communication between the flues and the regenerators is by means of forked regenerator-ducts 36, each extending first obliquely and then vertically upward into the top of the heavy wall 27, and then forking into two ascending ports 37, 38 that respectively open into a pair of oppositely facing contiguous flues, one in each of the two flue-series in the heating-wall. These two branches of such forked duct become substantially vertical under the flue into which each becomes a port, and are so offset from the main channel of the duct (at its place of forking, 39) as to equalize the regenerator flow from such channel into and through such branches of the fork.

When the ovens are operated as "coke-ovens", all of the regenerators used are employed as air-regenerators, and the fuel-gas employed is coke-oven gas supplied through the gas-ducts 33. When the ovens are operated as coking "gas-ovens", the coke-oven gas supply is shut off from the gas-ducts 33, and only alternate regenerators are employed as air-regenerators, and the other regenerators of the battery are employed as gas-regenerators for preheating producer-gas. Each longitudinal half of each regenerator has beneath it a channel 40 through which air or gas to be preheated is admitted and distributed, and through which, upon reversal, the waste-gas passes to the stack main. The reversing and shut-off means for all of the air and gas connections with the channels 40 and gas-ducts 33 are of the well-known form shown in, for instance, the Koppers Patent 1,176,067.

Above the flues in each heating-wall there are a pair of combustion-products ducts 41, 42, separated by a longitudinal vertical wall 43 and each communicating with one of the series of flues, through their top-ports 44, whose orifices opening into such ducts are regulated by the adjustable slide-bricks 45, operated from above through the vertical passages 46 that extend to the top of the battery and are closed by the cap-plates 47.

When the battery is in full operation, the entire group of both series of flues for substantially half the length of each heating-wall is fired simultaneously, and the combustion-products flow horizontally through the ducts 41, 42 and down into and through the flues of the group constituting the other half of the length of the heating-wall, and thence through the regenerators of the corresponding other half or side of the battery.

Any regenerator, or either longitudinal half of any regenerator, may be shut off from its communication with either or both of the series of flues in a heating-wall, by shutting off the corresponding regenerator port, with the shiftable closure-brick 48 that rests upon the bottom of each flue and is operable by means of a rod thrust down through the corresponding vertical passage 46 and flue top-port 44. Through this means, together with the usual means for shutting off the channels 40 under the regenerators, the employment of any regenerator, or of either longitudinal half of any regenerator, on either side of its longitudinal partition 29, may be dispensed with, and any coking-chamber may be individually heated, and heated by the firing of either both or only one of the two series of flues in the heating-wall on each or either side of such coking-chamber.

When the ovens are being operated as "gas-ovens", employing the series of regenerators as alternate air-regenerators and gas-regenerators, the regenerator-duct ports 37, 38 are normally left fully open into the combustion-flues of the heating-walls that are being thus fired with preheated producer-gas. But when the ovens are operated as "coke-ovens", firing with the coke-oven gas supply and employing the regenerators only as air-regenerators, it becomes necessary to reduce the air flow that would then enter the combustion-flues if the regenerator-duct ports were left fully open into the flues. It is also desirable under various conditions to increase the velocity of the air-streams that are projected into the combustion-flues, and also to maintain such streams in substantial parallelism with the inflowing jet of coke-oven gas. To these ends there are provided removable plugs 49 for reducing the orifices of the said regenerator-duct ports 37, 38 or either of them. These plugs are adapted to enter deeply into said ports and form with the opposing walls thereof a straight channel, whereby the cross-section of the issuing air-stream is reduced without deflecting it from its substantial parallelism with the gas-stream that is being projected upward into the flue from the gas channel 35. These plugs 49 are of refractory material, and the top of each plug is provided with a flange 50 that is adapted to socket in a corresponding recess 51 in the top edge of one side of the air-port. The bottom of the plug is so formed and proportioned that the air impinging upon it will be deflected against the opposite free vertical wall of the air-port far enough below the top of such port so that the upwardly projected air-stream will not be deflected from a substantially vertical direction. The plugs are inserted in and withdrawn from the air-ports by means of a hand-rod 52 whose bent end is hooked into the socket 53 in the free front face of the plug, such hand-rod being thrust down through the vertical passage 46 into the corresponding flue in whose air-ports the plugs are to be inserted or lifted out. A further closure of any air-port may be effected by shifting the above mentioned closure-brick 48, either with or without removal of a plug 49.

Each coking-chamber is provided at its top with four charge holes 54 and also has a by-product gas-port 55 at its pusher end, and, near its other end, a smoke outlet 56, employed while charging the oven. All of these openings are of course provided with suitable closures in the usual manner.

My invention as hereinafter claimed may of course be embodied in various ways and forms other than the embodiment that has been described as an illustrative instance.

Those broad features of invention exemplified in the foregoing description which relate to the general regenerator and flue and waste-gas conduit arrangement irrespectively of its employment in a gas-oven or a combination gas-oven and coke-oven, and also those features of invention which relate to the particular plugging devices for the air-inlets into the flues, are the invention of another and are made the subject of the application Serial No. 147,134 filed of even date herewith by Joseph Becker, also a resident of Pittsburgh, Pennsylvania.

I claim:

1. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls, said walls being constituted of two series of substantially triangular combustion-flues, those of one series alternating with those of the other, and the two series respectively facing oppositely toward the coking-chambers contiguous to either side of each such wall; air-regenerators communicating with each of said flues and in alternation supplying preheated air thereto and drawing combustion-products therefrom; and gas-regenerators also communicating with each of the same flues and in alternation supplying preheated gas thereto and drawing combustion-products therefrom; substantially as specified.

2. In a coking retort oven of regenerative type and having means for reversing the communication of the respective regenerators with the stack-gas outflow and effecting in alternation the firing of certain of the combustion flues and the drawing off of the combustion-products from others of such flues, in combination: a series of elongated coking-chambers with intermediate heating-walls, said walls being constituted of two series of substantially triangular combustion-flues, those of one series alternating with those of the other, and the two series respectively facing oppositely toward the coking-chambers contiguous to either side of each such wall; and cross-regenerators for preheating air and other cross-regenerators for preheating gas, both communicating with each of said flues and positioned below the series of coking-chambers and heating-walls, the air-regenerators in alternation supplying preheated air to and drawing combustion-products from the flues, and the gas-regenerators in alternation supplying preheated gas to and drawing combustion-products from the flues; substantially as specified.

3. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls, said walls being constituted of two series of substantially triangular combustion-flues, those of one series alternating with those of the other, and the two series respectively facing oppositely toward the coking-chambers contiguous to either side of each such wall, said flues being grouped in the respective halves of the length of such wall; conduit means for conducting the combustion-products from one to the other of the groups of flues occupying the respective halves of the length of each heating-wall; air-regenerators separately communicating with said groups of flues and in alternation supplying preheated air to the one group and drawing combustion-products from the other group; and gas-regenerators also separately communicating with the same groups of flues and in alternation supplying preheated gas to the one group and drawing combustion products from the other group; substantially as specified.

4. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls, said walls being constituted of two series of substantially triangular combustion-flues alternately facing oppositely toward the coking-chambers contiguous to either side of each such wall, and grouped in the respective halves of the length of such wall; a pair of combustion-products ducts respectively communicating with each series of flues in the heating-wall between each pair of coking-chambers, and adapted to conduct the combustion-products from one to the other of the groups of flues occupying the respective halves of the length of each heating-wall; and cross-regenerators for preheating air and other cross-regenerators for preheating gas, arranged in double pairs alined under the soles of the coking-chambers and separately communicating with the flues grouped in the respective halves of the length of each heating-wall, the air-regenerators in alternation supplying preheated air to the one group and drawing combustion-products from the other group of flues, and the gas-regenerators in alternation supplying preheated gas to the one group and drawing combustion-products from the other group of the same flues; substantially as specified.

5. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls, said walls being constituted of two parallel series of combustion-flues, the respective series facing oppositely toward the coking-chambers contiguous to either side of each such wall; air-regenerators communicating with each of said flues and in alternation supplying preheated air thereto and drawing combustion-products therefrom; and gas-regenerators also communicating with each of the same flues and in alternation supplying preheated gas thereto and drawing combustion-products therefrom; substantially as specified.

6. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of elongated coking chambers with intermediate heating-walls, said walls being constituted of two parallel series of combustion-flues, the respective series facing oppositely toward the coking-chambers contiguous to either side of each such wall; and cross-regenerators for preheating air and other cross-regenerators for preheating gas, both communicating with said flues and positioned below the series of coking-chambers and heating-walls, the air-regenerators in alternation supplying preheated air to and drawing combustion-products from the flues, and the gas-regenerators in alternation supplying preheated gas to and drawing combustion-products from the same flues; substantially as specified.

7. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls, said walls being constituted of two parallel series of combustion-flues, the respective series facing oppositely toward the coking-chambers contiguous to either side of each such wall, said flues being grouped in the respective halves of the length of such wall; conduit means for conducting the combustion-products from one to the other of the groups of flues occupying the respective halves of the length of each heating-wall; air-regenerators separately communicating with said groups of flues and in alternation supplying preheated air to the one group and drawing combustion-products from the other group; and gas-regenerators also separately communicating with the same groups of flues and in alternation supplying preheated gas to the one group and drawing combustion-products from the other group; substantially as specified.

8. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls, said walls being constituted of two parallel series of combustion-flues facing oppositely toward the coking-chambers contiguous to either side of each such wall, and grouped in the respective halves of the length of such wall; a pair of combustion-products ducts respectively communicating with each series of flues in the heating-wall between each pair of coking chambers, and adapted to conduct the combustion-products from one to the other of the groups of flues occupying the respective halves of the length of each heating-wall; and cross-regenerators for preheating air and other cross-regenerators for preheating gas, arranged in double pairs alined under the soles of the coking-chambers and separately communicating with the flues grouped in the respective halves of the length of each heating-wall, the air-regenerators in alternation supplying preheated air to the one group and drawing combustion-products from the other group of flues, and the gas-regenerators in alternation supplying preheated gas to the one group and drawing combustion-products from the other group of the same flues; substantially as specified.

9. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls constituted of two series of combustion-flues, the series being respectively contiguous to the coking-chambers on either side of each such wall and the flues in each series being narrow transversely of the wall and presenting wide heating-faces toward the contiguous coking-chamber; air regenerators communicating with each of said flues and in alternation supplying preheated air thereto and drawing combustion-products therefrom; and gas-regenerators also communicating with each of the same flues and in alternation supplying preheated gas thereto and drawing combustion-products therefrom; substantially as specified.

10. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls constituted of two series of combustion-flues, the series being respectively contiguous to the coking-chambers on either side of each such wall and the flues in each series being narrow transversely of the wall and presenting wide heating-faces toward the contiguous coking-chamber; and cross-regenerators for preheating air and other cross-regenerators for preheating gas, both communicating with said flues and positioned below the series of coking-chambers and heating-walls, the air-regenerators in alternation supplying preheated air to and drawing combustion-products from the flues, and the gas-regenerators in alternation supplying preheated gas to and drawing combustion-products from the same flues; substantially as specified.

11. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls constituted of two series of combustion-flues, the series being respectively contiguous to the coking-chambers on either side of each such wall and the flues in each series being narrow transversely of the wall and presenting wide heating-faces toward the contiguous coking-chamber, said flues being grouped in the respective halves of the length of such wall; conduit means for conducting the combustion-products from one to the other of the groups of flues occupying the respective halves of the length of each heating-wall; air-regenerators separately communicating with said groups of flues and in alternation supplying preheated air to the one group and drawing combustion-products from the other group; and gas-regenerators also separately communicating with the same groups of flues and in alternation supplying preheated gas to the one group and drawing combustion-products from the other group; substantially as specified.

12. In a coking retort oven of regenerative type and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls constituted of two series of combustion-flues respectively contiguous to the coking-chambers on either side of each such wall, the flues in each series being narrow transversely of the wall and presenting wide heating-faces toward the contiguous coking-chamber, said flues being grouped in the respective halves of the length of such wall; a pair of combustion-products ducts respectively communicating with each series of flues in the heating-wall between each pair of coking-chambers, and adapted to conduct the combustion-products from one to the other of the groups of flues occupying the respective halves of the length of each heating-wall; and cross-regenerators for preheating air and other cross-regenerators for preheating gas, arranged in double pairs alined under the soles of the coking-chambers and separately communicating with the flues grouped in the respective halves of the length of each heating-wall, the air-regenerators in alternation supplying preheated air to the one group and drawing combustion-products from the other group of flues, and the gas-regenerators in alternation supplying preheated gas to the one group and drawing combustion-products from the other group of the same flues; substantially as specified.

13. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls, said walls being constituted of two series of substantially triangular combustion-flues, those of one series alternating with those of the other, and the two series respectively facing oppositely toward the coking-chambers contiguous to either side of each such wall; air-regenerators communicating with each of said flues and in alternation supplying preheated air thereto and drawing combustion-products therefrom; gas-regenerators also communicating with each of the same flues and in alternation supplying preheated gas thereto and drawing combustion-products therefrom; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

14. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls, said walls being constituted of two series of substantially triangular combustion-flues, those of one series alternating with those of the other, and the two series respectively facing oppositely toward the coking-chambers contiguous to either side of each such wall; cross-regenerators for preheating air and other cross-regenerators for preheating gas, both communicating with said flues and positioned below the series of coking-chambers and heating-walls, the air-regenerators in alternation supplying preheated air to and drawing combustion-products from the flues, and the gas-regenerators in alternation supplying preheated gas to and drawing combustion-products from the same flues; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

15. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls, said walls being constituted of two series of substantially triangular combustion-flues, those of one series alternating with those of the other, and the two series respectively facing oppositely toward the coking-chambers contiguous to either side of each such wall, said flues being grouped in the respective halves of the length of such wall; conduit means for conducting the combustion-products from one to the other of the groups of flues occupying the respective halves of the length of each heating-wall; air-regenerators separately communicating with said groups of flues and in alternation supplying preheated air to the one group and drawing combustion-products from the other group; gas-regenerators also separately communicating with said groups of the same flues and in alternation supplying preheated gas to the one group and drawing combustion-products from the other group; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

16. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls, said walls being constituted of two series of substantially triangular combustion-flues alternately facing oppositely toward the coking-chambers contiguous to either side of each such wall, and grouped in the respective halves of the length of such wall; a pair of combustion-products ducts respectively communicating with each series of flues in the heating-wall between each pair of coking-chambers, and adapted to conduct the combustion-products from one to the other of the groups of flues occupying the respective halves of the length of each heating-wall; cross-regenerators for preheating air and other cross-regenerators for preheating gas, arranged in double pairs alined under the soles of the coking-chambers and separately communicating with the flues grouped in the respective halves of the length of each heating-wall, the air-regenerators in alternation supplying preheated air to the one group and drawing combustion-products from the other group of flues, and the gas-regenerators in alternation supplying preheated gas to the one group and drawing combustion-products from the other group of flues; separate gas-conduits as aforesaid being arranged for leading another gas-supply directly to the flues independently of the regenerators, to permit employing the latter gas-supply and converting the aforesaid gas-regenerators into supplementary air-generators; substantially as specified.

17. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls, said walls being constituted of two parallel series of combustion-flues, the respective series facing oppositely toward the coking-chambers contiguous to either side of each such wall; air-regenerators communicating with each of said flues and in alternation supplying preheated air thereto and drawing combustion-products therefrom; gas-regenerators also communicating with each of the same flues and in alternation supplying preheated gas thereto and drawing combustion-products therefrom; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

18. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls, said walls being constituted of two parallel series of combustion-flues, the respective series facing oppositely toward the coking-chambers contiguous to either side of each such wall; cross-regenerators for preheating air and other cross-regenerators for preheating gas, both communicating with said flues and positioned below the series of coking-chambers and heating-walls, the air-regenerators in alternation supplying preheated air to and drawing combustion-products from the flues, and the gas-regenerators in alternation supplying preheated gas to and drawing combustion-products from the same flues; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

19. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls, said walls being constituted of two parallel series of combustion-flues, the respective series facing oppositely toward the coking-chambers contiguous to either side of each such wall; conduit means for conducting the combustion products from one to the other of the group of flues occupying the respective halves of the length of each heating-wall; air-regenerators separatively communicating with said groups of flues and in alternation supplying preheated air to the one group and drawing combustion-products from the other group; gas-regenerators also separately communicating with the same groups of flues and in alternation supplying preheated gas to the one group and drawing combustion-products from the other group; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

20. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls, said walls being constituted of two parallel series of combustion-flues facing oppositely toward the coking-chambers contiguous to either side of each such walls, said flues being grouped in the respective halves of the length of such wall; a pair of combustion-products ducts respectively communicating with each series of flues in the heating-wall between each pair of coking-chambers, and adapted to conduct the combustion-products from one to the other of the groups of flues occupying the respective halves of the length of each heating-wall; cross-regenerators for preheating air and other cross-regenerators for preheating gas, arranged in double pairs alined under the soles of the coking-chambers and separately communicating with the flues grouped in the respective halves of the length of each heating-wall, the air-regenerators in alternation supplying preheated air to the one group and drawing combustion-products from the other group of flues, and the gas-regenerators in alternation supplying preheated gas to the one group and drawing combustion-products from the other group of the same flues; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

21. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls constituted of two series of combustion-flues, the series being respectively contiguous to the coking-chambers on either side of each such wall and the flues in each series being narrow transversely of the wall and presenting wide heating-faces toward the contiguous coking-chamber; air-regenerators communicating with each of said flues and in alternation supplying preheated air thereto and drawing combustion-products therefrom; gas-regenerators also communicating with each of the same flues and in alternation supplying preheated gas thereto and drawing combustion products therefrom; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

22. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls constituted of two series of combustion-flues, the series being respectively contiguous to the coking-chambers on either side of each such wall and the flues in each series being narrow transversely of the wall and presenting wide heating-faces toward the contiguous coking-chamber; cross-regenerators for preheating air and other cross-regenerators for preheating gas, both communicating with said flues and positioned below the series of coking-chambers and heating-walls, the air-regenerators in alternation supplying preheated air to and drawing combustion-products from the flues, and the gas-regenerators in alternation supplying preheated gas to and drawing combustion-products from the same flues; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

23. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls constituted of two series of combustion-flues, the series being respectively contiguous to the coking-chambers on either side of each such wall and the flues in each series being narrow transversely of the wall and presenting wide heating-faces toward the contiguous coking-chamber, said flues being grouped in the respective halves of the length of such wall; conduit means for conducting the combustion-products from one to the other of the groups of flues occupying the respective halves of the length of each heating-wall; air-regenerators separately communicating with said groups of flues and in alternation supplying preheated air to the one group and drawing combustion-products from the other group; gas-regenerators also separately communicating with the same groups of flues and in alternation supplying preheated gas to the one group and drawing combustion-products from the other group; separate gas-conduits as aforesaid being arranged for leading another gas-supply directly to the flues independently of the regenerators, to permit employing the latter gas-supply and converting the aforesaid gas-regenerators into supplementary air-regenerators; substantially as specified.

24. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of elongated coking-chambers with intermediate heating-walls constituted of two series of combustion-flues respectively contiguous to the coking-chambers on either side of each such wall, the flues in each series being narrow transversely of the wall and presenting wide heating-faces toward the contiguous coking-chamber, said flues being grouped in the respective halves of the length of such wall; a pair of combustion-products ducts respectively communicating with each series of flues in the heating-wall between each pair of coking-chambers, and adapted to conduct the combustion-products from one to the other of the groups of flues occupying the respective halves of the length of each heating-wall; cross-regenerators for preheating air and other cross-regenerators for preheating gas, arranged in double pairs alined under the soles of the coking-chambers and separately communicating with the flues grouped in the respective halves of the length of each heating-wall, the air-regenerators in alternation supplying preheated air to the one group and drawing combustion-products from the other group of flues, and the gas-regenerators in alternation supplying preheated gas to the one group and drawing combustion-products from the other group of the same flues; separate gas-conduits as aforesaid being arranged for leading another gas-supply directly to the flues independently of the regenerators, to permit employing the latter gas-supply and converting the aforesaid gas-regenerators into supplementary air-regenerators: substantially as specified.

25. In a coking retort oven of regenerative type and having two different gas supplies respectively connectible with regenerators and with ducts independent of the regenerators, and having means for reversing the communication of the respective regenerators with the stack-gas outflow and effecting in alternation the firing of certain of the combustion-flues and the drawing off of the combustion-products from others of such flues, in combination: a series of coking-chambers with intermediate heating-walls, said walls being constituted of two series of substantially triangular combustion-flues, those of one series alternating with those of the other, and the two series respectively facing oppositely toward the coking-chambers contiguous to either side of each such wall; air-regenerators communicating with each of said flues and in alternation supplying preheated air thereto and drawing combustion-products therefrom; gas regenerators also communicating with each of the same flues and in alternation supplying preheated gas thereto and drawing combustion-products therefrom; separate gas-conduits as aforesaid being arranged for leading another gas-supply directly to the flues independently of the regenerators, to permit employing the latter gas-supply and converting the aforesaid gas-regenerators into supplementary air-regenerators; and shiftable cut-offs for reducing the double air-inlet apertures within the flues when both of the regenerator system are employed as air-regenerators, in firing with the said independent gas-supply; substantially as specified.

26. In a coking retort oven, in combination: a series of elongated coking-chambers with intermediate heating-walls, said walls being constituted of two parallel series of combustion-flues facing oppositely toward the coking-chambers contiguous to either side of each such wall; cross-regenerators alined under the soles of the coking-chambers on either side of each heating-wall; and forked ducts leading from each regenerator to the mutually adjacent flues of both series in said heating-wall; substantially as specified.

27. In a coking retort oven, in combination: a series of elongated coking-chambers with intermediate heating-walls, said walls being constituted of two parallel series of combustion-flues facing oppositely toward the coking-chambers contiguous to either side of each such wall; cross-regenerators alined under the soles of the coking-chambers on either side of each such heating-wall; and forked ducts leading from each regenerator to the mutually adjacent flues of both series in said heating-wall, the branches of each such forked duct becoming substantially vertical under the flue each enters and being so offset from the inclined main channel of the duct as to equalize the regenerator flow from such channel into and through such branches; substantially as specified.

28. In a coking retort oven, in combination: a series of elongated coking-chambers with intermediate heating-walls, said walls being constituted of two series of substantially triangular combustion-flues alternately facing oppositely toward the coking-chambers contiguous to either side of each such wall; cross-regenerators alined under the soles of the coking-chambers on either side of both heating walls; and forked ducts leading from each regenerator to the mutually adjacent flues of each series in said heating-wall; substantially as specified.

29. In a coking retort oven, in combination: a series of elongated coking-chambers with intermediate heating-walls, said walls being constituted of two series of substantially triangular combustion-flues alternately facing oppositely toward the coking-chambers contiguous to either side of each such wall; cross-regenerators alined under the soles of the coking-chambers on either side of each heating-wall; and forked ducts leading from each regenerator to the mutually adjacent flues of both series in said heating-wall, the branches of each such forked duct becoming substantially vertical under the flue each enters and being so offset from the inclined main channel of the duct as to equalize the regenerator flow from such channel into and through such branches; substantially as specified.

30. In a coking retort oven, in combination: a series of elongated coking-chambers with intermediate heating-walls constituted of two series of combustion-flues respectively contiguous to the coking-chambers on either side of each such wall; and cross-regenerators below the series of coking-chambers and heating-walls and individually arranged to supply preheated air to and simultaneously serve both of the two series of flues in the same heating-wall; substantially as specified.

31. In a coking retort oven, in combination: a series of elongated coking-chambers with intermediate heating-walls constituted of two series of combustion-flues respectively contiguous to the coking-chambers on either side of each such wall; and cross-regenerators below the series of coking chambers and heating walls and individually having ducts leading to both of the two series of flues simultaneously served in the same heating wall; substantially as specified.

32. In a coking retort oven, in combination: a series of coking-chambers with intermediate heating-walls, said walls being constituted of two series of substantially triangular combustion-flues, the series laterally abutting each other and being respectively contiguous to the coking-chambers on either side of each such wall; air-regenerators and gas-regenerators; and communications that directly connect each of the triangular flues with both an air-regenerator and a gas-regenerator that simultaneously serve such flue; substantially as specified.

In testimony whereof I have hereunto set my hand in the presence of two subscribing witnesses.

JOSEF VAN ACKEREN.

Witnesses:
G. G. TRIEL,
JOS. DVORAK.

Copies of this patent may be obtained for five cents each, by addressing the "Commissioner of Patents, Washington, D. C."